Dec. 23, 1952     C. HOLLERITH     2,622,530
DEBOOSTER
Filed June 5, 1947
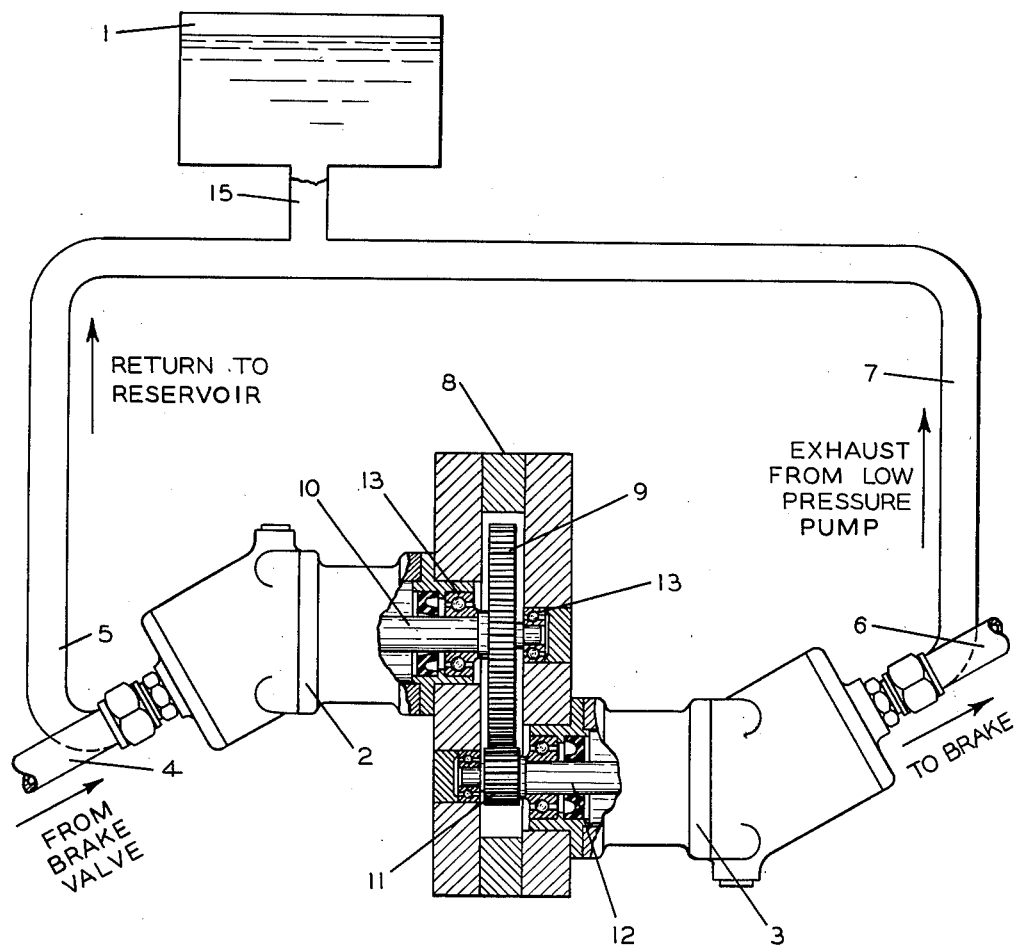
Inventor
CHARLES HOLLERITH
By Beaman & Patch
Attorneys Patented Dec. 23, 1952

2,622,530

UNITED STATES PATENT OFFICE 2,622,530

DEBOOSTER

Charles Hollerith, Jackson, Mich., assignor, by mesne assignments, to The B. F. Goodrich Company, Akron, Ohio, a corporation of New York Application June 5, 1947, Serial No. 752,594

5 Claims. (Cl. 103—3)

This invention relates to fluid pressure deboosters such as are employed in fluid pressure brake systems to receive the fluid pressure at a high pressure and discharge the same at the lower pressure required to operate the brakes.

In connection with aircraft in particular which employ a high pressure fluid system for actuating the landing wheel brakes but which brakes are operated only at a relatively low pressure, it is customary to include a pressure reducing means, hereinafter referred to as a "debooster," in the fluid pressure system between the brake metering control valve and the brakes. The conventional debooster consists of a small high pressure piston mechanically connected to a large low pressure piston and incorporating a bleed-through or by-pass valve, so that if the low pressure piston movement is insufficient to fill the brake (if this be of the expander tube type), or to otherwise apply the brake, the bleed-through or by-pass valve is pushed-off its seat, or opened, to permit the high pressure fluid to bleed-through until the brake pressure is sufficient to push the large piston away from the end of its cylinder and close the by-pass valve. When this occurs there is a delay in the operation of the brake, which is objectionable.

The conventional deboosters, also, are open to several objections in practice among which may be mentioned their limited volume capacity and which it is the object of the present invention to overcome by providing an improved debooster arrangement which in particular, is of infinite volume and with which the delay action above mentioned is obviated.

An object of the invention, therefore, is to provide in a fluid pressure of hydraulic brake system a pressure reducing or debooster means consisting of two pumps connected in circuit with one another and consisting of a high pressure pump connected to the high pressure supply and a low pressure pump connected to the braking means.

The invention also has for its objects to provide, in an arrangement according to the preceding paragraph, that if pressure from the brake metering valve is applied to the high pressure pump as a motor, this causes the other pump to deliver a larger volume of the pressure fluid at a reduced pressure.

It is also an object of the invention to provide that when the brake applying means is released the fluid pressure returns through the low pressure pump as a hydraulic motor and at the same time a portion of the fluid from this low pressure pump is passed through the high pressure pump back to the brake valve.

These and other objects, residing in the arrangement, combination and construction of parts will be apparent from the following description when considered in conjunction with the accompanying drawing, which is schematic in character and illustrates one application of the invention, in which the two pumps are interconnected by a mechanical reduction gearing, shown in section in the drawing.

Referring to the drawing, the fluid pressure or hydraulic brake system shown therein, and which is particularly designed for application to aircraft, comprises an atmospheric reservoir 1 connected by piping with a brake metering valve and with the brake applying means, neither of which is shown but which are coupled with one another through the medium of a pair of hydraulic pumps 2 and 3, which pumps are connected in circuit with one another and consist of the high pressure pump 2 and the low pressure pump 3.

The high pressure pump 2 is connected with the brake metering valve by an inlet pipe 4 and also has a return pipe line 5 for delivering fluid back to the reservoir. The low pressure pump 3, on the other hand, has an outlet pipe 6 for delivering the pressure fluid to the brake applying means and also an exhaust pipe 7 leading back to the reservoir 1.

In the particular example shown in the drawing the two pumps are inter-connected through the medium of a reduction gearing, indicated generally at 8, and comprising a large gear wheel 9 mounted upon the high pressure pump shaft 10 and a small gear wheel 11 mounted upon the low pressure pump shaft 12. The two shafts are mounted in the sides of the casing of the reduction gear by bearings 13 and the relative sizes of the gear wheels are chosen so as to give the desired speed reduction between the high pressure pump and the low pressure pump.

The pumps are of similar construction and may be of any suitable and standard type capable of operating alternatively as a pump or motor. The pumps illustrated are standard Vickers pumps of the wobble plate and multi-piston type and the reduction gearing provides a 1:5 ratio, but it will be appreciated that other types of displacement pumps may be employed and that the actual gear reduction may be of any desired and suitable ratio.

In operation, and assuming the gear reduction ratio is 1:5, and neglecting friction, if the high pressure pump 2 is subjected to the fluid pressure of the brake supply system by way of the metering valve this pump will function as a motor to drive the low pressure pump 3 at five times its own speed, whereby the low pressure pump will displace five times the volume of fluid at ⅕ the pressure, which is suitable for the applying of a large volume low pressure brake. When, on the reverse action, the brake valve is released, the pressure in the brake then reverses the operation of the pumps to cause the low pressure pump 3 to operate as a hydraulic motor, which in turn drives the high pressure pump 2 and thereby releases the pressure through the brake valve.

Due to the fact that the low pressure pump 3 displaces five times the volume of the high pressure pump, it becomes necessary to supply more fluid to the low pressure pump than is delivered from the exhaust 5 of the high pressure pump and, therefore, the two exhaust lines 5 and 7 are joined, as shown, and connected by a common line 15 to the atmospheric reservoir 1 from which the required additional make-up fluid is taken.

On the release of the brake, the pressure fluid reacts through the low pressure pump 3, which then operates as a hydraulic motor, and returns the fluid to the reservoir. At the same time, a portion of the fluid from the pump 3 is pumped through the high pressure pump and back through the brake valve.

It should be noted that with this arrangement, there is no question of volume, but only of high pressure, which so long as it is applied will produce a larger volume of low pressure fluid, up to the capacity of the reservoir 1.

Having thus described my invention, what I desire to protect by Letters Patent and claim is:

1. Apparatus for operating a low pressure fluid-operated mechanism from a high pressure fluid supply, said apparatus comprising a high-pressure fluid-operated motor connected to said supply, a low-pressure pump connected to said low-pressure-operated mechanism, and means for driving said pump from said motor, said driving means comprising a velocity-increasing mechanism for reducing pressure at said pump, said motor and said pump being operatively reversible under return flow of fluid, and a supply vessel at atmospheric pressure connecting exhaust lines from said motor and said pump and supplying said pump with fluid.

2. Apparatus for operating a low pressure fluid-operated mechanism from a high pressure fluid supply, said apparatus comprising a high-pressure fluid-operated motor connected to said supply, a low-pressure pump connected to said low-pressure-operated mechanism, and means for driving said pump from said motor, said motor and said pump being operatively reversible under return flow of fluid, and supply means at atmospheric pressure connecting exhaust lines from said motor and said pump and supplying said pump with fluid.

3. Apparatus for operating a low pressure fluid-operated brake from a high pressure fluid supply, said apparatus comprising a reversible motor pump member connected to the high pressure fluid supply, a second reversible motor pump member connected to the low pressure brake operating line, said motor pump members each having a rotor, and a rotation multiplying gear train coupling said rotors to each other for transmission of movement from one to the other.

4. Apparatus for operating a low pressure fluid-operated brake from a high pressure fluid supply, said apparatus comprising a reversible motor pump member connected to the high pressure fluid supply, a second reversible motor pump member connected to the low pressure brake operating line, said motor pump members each having a rotor, and means coupling said rotors to each other for transmission of movement from one to the other.

5. Apparatus controlled by fluid under high pressure for operating a low pressure fluid-operated brake, said apparatus comprising a motor pump member having a rotor mounted for rotation in one direction as a motor by fluid from a high pressure supply, a second motor-pump member having a rotor mounted for rotation in one direction as a pump to deliver fluid under low pressure to a brake, said motors being rotatable in the opposite directions by return flow of fluid, and a rotation-multiplying gear train mounted to transmit motion from one rotor to the other.

CHARLES HOLLERITH.

REFERENCES CITED

The following references are of record in the file of this patent:

UNITED STATES PATENTS

| Number | Name | Date |
|---|---|---|
| 1,214,300 | Grouvelle et al. | Jan. 30, 1917 |
| 1,665,016 | Grant | Apr. 3, 1928 |
| 1,689,791 | McClatchie | Oct. 30, 1928 |
| 1,734,779 | Randolph | Nov. 5, 1929 |
| 1,781,416 | Sundstrand | Nov. 11, 1930 |
| 1,843,246 | Sloane | Feb. 2, 1932 |
| 2,281,138 | Christensen | Apr. 28, 1942 |
| 2,353,802 | Zimmermann | July 18, 1944 |